United States Patent Office 3,317,529
Patented May 2, 1967

3,317,529
N-HALOMETHYL s-TRIAZINES
Michael Thomas Beachem, Somerset, and John Christian Oppelt, Manville, N.J., assignors to American Cyanamid Company, Stamford, Conn., a corporation of Maine
No Drawing. Filed July 7, 1964, Ser. No. 380,947
12 Claims. (Cl. 260—249.6)

This invention relates to a new class of compounds and to processes for their preparation. More particularly, it relates to N-halomethyl s-triazines and their process of preparation and still more particularly s-triazines of the formulas set forth hereinbelow.

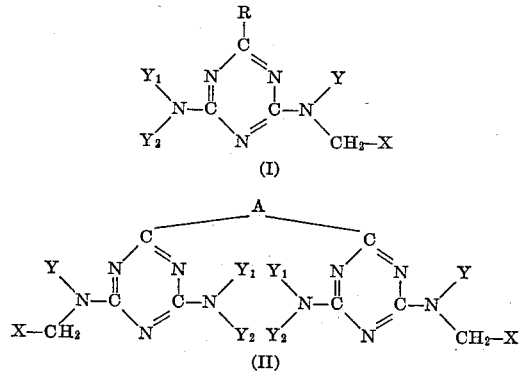

wherein X is chlorine or bromine; R is hydrogen, alkyl, aralkyl, aryl, or

A is a divalent hydrocarbon radical (polymethylene or phenylene); Y, $Y_1$, $Y_2$, $Y_3$ and $Y_4$ are lower alkyl, —$CH_2OR_1$ or —$CH_2X$; $R_1$ is alkyl or alkene; and the R and A radicals may be substituted by inert substituents such as cyano, halogen, etc.

The compounds of this invention are prepared by reacting an s-triazine of Formulas III and IV with certain acid halides such as acid chlorides or acid bromides in accordance with the following equations:

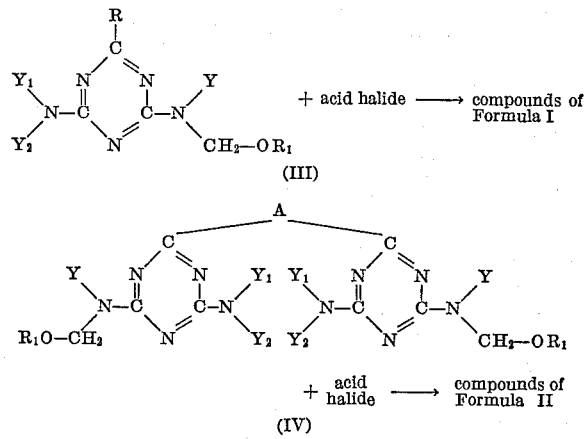

In Formulas III and IV above, R is hydrogen, alkyl, aralkyl, aryl or

Y, $Y_1$, $Y_2$, $Y_3$ and $Y_4$ are lower alkyl, —$CH_2$—X or —$CH_2OR_1$; A is a divalent hydrocarbon radical; $R_1$ is alkyl or alkenyl; and X is chlorine or bromine. The acid halide may be an acid bromide or acid chloride.

It will be observed from the formulas set forth above that the s-triazines of Formulas I, II, III and IV are N-substituted derivatives of guanamines and melamine.

The s-triazines of Formulas III and IV are N-alkoxymethyl derivatives of 2,4-diamino-s-triazines (guanamines) and of 2,4,6-triamino-s-triazines (melamines), respectively. The non-nuclear (i.e., amido) nitrogens of the s-triazines must be completely substituted by alkoxymethyl or lower alkyl groups. The s-triazines must be free of all active hydrogens.

Suitable melamine derivatives of Formulas III and IV employable in the process of this invention include N,N,N',N',N'',N''-hexakis(methoxymethyl)-2,4,6-triamino-s-triazine, N',N',N''-trimethyl-N,N',N''-tris(methoxymethyl)-2,4,6-triamino-s-triazine, N,N,N',N''-tetramethyl-N',N''-bis-(methoxymethyl)-2,4,6-triamino-s-triazine, N,N,N',N''-tetramethyl-N',N''-bis(octyloxymethyl)-

N,N,N',N',N'',N''-hexakis(allyloxymethyl)-2,4,6-triamino-s-triazine,

N,N,N',N''-tetramethyl-N',N''-bis(octadecyloxymethyl) 2,4,6-triamino-s-triazine, and the like.

Examples of suitable guanamine derivatives which may be employed in the process of this invention are the following:

N,N,N',N'-tetrakis(methoxymethyl)-2,4-diamino-s-triazine,

N,N,N',N'-tetrakis(methoxymethyl)-2,4-diamino-6-methyl-s-triazine,

N,N,N',N'-tetrakis(methoxymethyl)-2,4-diamino-6-ethyl-s-triazine,

N,N,N',N'-tetrakis(methoxymethyl)-2,4-diamino-6-octyl-s-triazine,

N,N,N',N'-tetrakis(methoxymethyl)-2,4-diamino-6-heptadecyl-s-triazine,

N,N,N',N'-tetrakis(methoxymethyl)-2,4-diamino-6-phenyl-s-triazine, 2,2'-hexamethylenebis(N,N,N',N'-tetrakis[methoxymethyl]-4,6-diamino-s-triazine), N,N,N',N'-tetrakis(butoxymethyl)-2,4-diamino-s-triazine, and the like.

The acid halides which may be employed in the process of this invention are chlorides and bromides. They include thionyl chloride, thionyl bromide, phosgene, phosphorous pentachloride, phosphorous pentabromide, various acyl halides such as acetyl chloride, acetyl bromide, decanoyl bromide, succinyl chloride, and alkyl halosulfites, as for example methylchlorosulfite $$(CH_3O—SO—Cl)$$

and the like.

In general, acid halides may be defined as halogen compounds of the formula $$D—X$$

where X is bromine or chlorine and D is

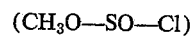
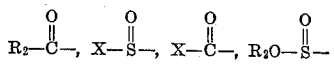

or $X_4P—$, and $R_2$ is alkyl or aryl. The preferred acid halides are phosgene and thionyl chloride and, of these, phosgene is preferred for reasons as will become apparent hereinafter.

The amount of acid halide employed in the process depends upon the number of halogen atoms in the acid halide and the properties of the by-products formed in the reaction. Thus, the amount depends upon the number of available halogen atoms present in the acid halide. It also depends upon the desired number of halogen atoms to be introduced into the molecule. In the case of the mono-halogen acid halides, one mole is required for each chloromethyl group to be formed. In the case of phosgene and phosphorous pentahalide, there is only one available halogen, and therefore one mole of acid halide is required for each halomethyl group to be formed. The by-product from phosgene is

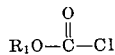

which does not react further with a —$CH_2OR_1$ group, but decomposes to give $R_1X$ and carbon dioxide. The by-products of phosphorous pentahalide are $POX_3$ and $CH_3X$ and further reaction does not take place. The by-product from the reaction with thionyl chloride, on the other hand, is

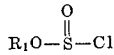

which then partially decomposes to form sulfur dioxide and $R_1Cl$ and partially reacts further with another —$CH_2OR_1$ group to form —$CH_2$—X.

Because of the properties of the by-products, phosgene in most cases is preferred over thionyl chloride. Methyl chloroformate, the by-product of phosgene, is stable and can therefore be recovered. Since methyl chloroformate is stable, and therefore exactly one chlorine atom of phosgene is available for the reaction with compounds of the Formulas III and IV above, the amount of phosgene to be employed is readily calculated.

In distinction, the by-product resulting from the use of thionyl chloride is methyl chlorosulfite, which is unstable. Although a portion of the methyl chlorosulfite will react with the compounds of Formulas I and II, the remainder decomposes. The amount that reacts and the amount that decomposes depends upon the reaction conditions and are difficult to predict. Thus, there is a problem in determining how much thionyl compound should be employed. A further disadvantage is that it is difficult to remove the last of the by-product sulfur dioxide from the reaction product.

The by-products from the reaction with acyl halide and alkyl halosulfites are esters of carboxylic acids and sulfurous acid, respectively.

The reaction of the compounds of Formulas III and IV with the acid halide or halogen compound D—X may be carried out with or without a solvent, though a solvent is preferred in that the reaction is more readily controlled. Suitable solvents include benzene, toluene, xylene, chlorobenzene, chloroform and the like.

In carrying out the reaction, the acid halide or halogen compound may be added to the molten s-triazine of Formulas III and IV or to a solution of the s-triazine at a temperature of from between 0 and 100° C. and normally the reaction mixture is heated at the final stages of reaction to a temperature of from between 40° and 120° C. until the reaction is essentially complete. The by-products and solvents, if used, may then be removed by distillation, preferably in vacuo. The residue is the product.

While normally the reaction is carried out at atmospheric pressure, it may be carried out at subatmospheric or superatmospheric pressure and may be carried out in a batch or continuous manner.

The N-halomethyl s-triazines of this invention are useful as fiber reactive agents and provide means of achieving a number of special effects on fibrous substrates, as for example textile materials. In particular, when the compounds contain two or more chloromethyl groups they serve as cross-linking reactants imparting crease resistance and shrinkage control to such substrates as cellulosic and proteinaceous textile materials. Moreover, the halomethyl s-triazines of this invention have all been found to possess antifungal activity against *Trichophyton mentagrophytes*, *Microsporum gypseum*, and *Chaetomium globsum* species of fungi.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

N-chloromethyl-N,N',N',N'',N''-pentakis(methoxymethyl)-2,4,6-triamino-s-triazine

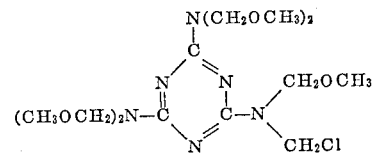

To a solution of 60 parts (0.154 mole) of N,N,N',N',N'',N''-hexakis(methoxymethyl)-2,4,6-triamino-s-triazine in about 90 parts of chloroform is added a solution of 18.3 parts (0.154 mole) of thionyl chloride in about 45 parts of chloroform while externally cooling with ice. The reaction mixture is then warmed to between 40° and 50° C. while distilling off sulfur dioxide and methyl chloride. The remainder of the volatile materials are removed by distillation in vacuo. The residual oil (about 60 parts) comprises the product.

EXAMPLE 2

N,N'-bis(chloromethyl)-N,N',N'',N''-tetrakis(methoxymethyl)-2,4,6-triamino-s-triazine

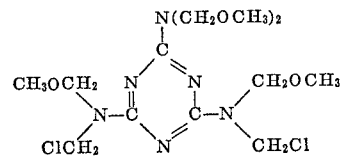

The general procedure of Example 1 is followed, using 19.5 parts of N,N,N',N',N'',N''-hexakis(methoxymethyl) 2,4,6-triamino-s-triazine, 6.0 parts of thionyl chloride and about 40 parts of benzene as solvent. After removal of the volatile materials, the product is obtained as an oil which crystallizes on standing.

EXAMPLE 3

N,N',N''-tris(chloromethyl)-N,N',N''-tris(methoxymethyl)-2,4,6-triamino-s-triazine

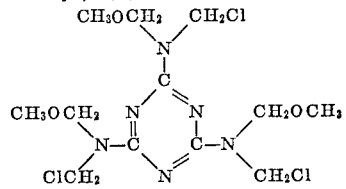

To 39.0 parts (0.1 mole) of N,N,N',N',N'',N''-hexakis(methoxymethyl) - 2,4,6 - triamino - s - triazine is added a solution of 47.1 parts (0.6 mole) of acetyl chloride in about 20 parts of benzene. After a heating period, the reaction mixture is distilled in vacuo to remove the volatile materials. (Analysis of the distillate indicates that three methoxy groups have been replaced by chlorine.)

EXAMPLE 4

N-chloromethyl-N,N',N',N'',N''-pentakis(methoxymethyl)-2,4,6-triamino-s-triazine

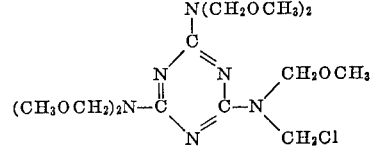

To a solution of 19.5 parts (0.05 mole) of N,N,N', N',N'',N'' - hexakis(methoxymethyl) - 2,4,6 - triamino-s-triazine in about 50 parts of benzene there is added at a temperature between 0° and 5° C. 5.0 parts (0.05 mole) of phosgene over about 30 minutes. The reaction mixture is then slowly heated to the reflux point and held at reflux for three hours. After removal of the benzene by distillation in vacuo, the desired product is recovered.

EXAMPLE 5

N,N',N'''-tris(chloromethyl)-N,N',N''-tris(methoxymethyl)-2,4,6-triamino-s-triazine

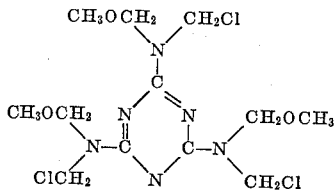

To 20 parts (0.051 mole) of molten N,N,N',N',N'', N''',-hexakis(methoxymethyl-2,4,6-triamino-s-triazine at a temperature between 80 and 90° C. there is added over 30 minutes 20 parts (0.204 mole) of phosgene. After removal of the volatile materials, including methyl chloroformate, by distilaltion in vacuo, the product is obtained as a residue analyzing for three atoms of chlorine per mole of s-triazine.

EXAMPLE 6

N-bromomethyl-N,N',N'N''',N'''-pentakis(ethoxymethyl)-2,4,6-triamino-s-triazine

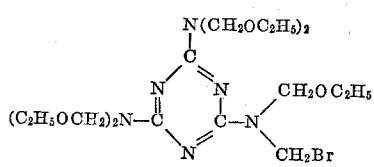

To a solution of 4.75 parts (0.01 mole) of N,N,N', N'',N''-hexakis (ethoxymethyl)-2,4,6-triamono-s-triazine in about 3 parts of toluene at about 80° C. is added a solution of 1.23 parts (0.01 mole) of acetyl bromide in about 2 parts of toluene. Ethyl acetate is evolved. The remaining volatile materials are removed by distillation in vacuo leaving a crystalline residue. This is the desired product.

Calculated for $C_{19}H_{37}BrN_6O_5$: N, 16.5. Found: N, 16.4.

EXAMPLE 7

N,N',N'''-tris(chloromethyl)-N,N',N''-trimethyl-2,4,6-triamino-s-triazine

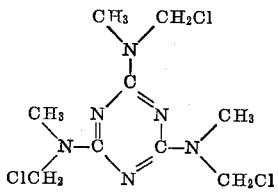

To a warm solution of 3.0 parts (0.01 mole) of N,N',N'' - trimethyl - N,N',N'' -tris(methoxymethyl) - 2,4,6-triamino-s-triazine in about 10 parts of benzene is added a solution of 3.57 parts (0.03 mole) of thionyl chloride in about 10 parts of benzene. The reaction mixture is heated for a short time while sulfur dioxide and methyl chloride are evolved, and the volatile materials are then removed by distillation in vacuo. A crystalline product is obtained.

Calculated for $C_9H_5Cl_3N_6$: C, 34.5; N, 26.8. Found: C, 34.5; N, 26.9.

EXAMPLE 8

N,N'-bis(chloromethyl)-N,N',N''',N'''-tetramethyl-2,4,6-triamino-s-triazine

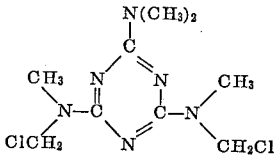

To a warm solution of 2.7 parts (0.01 mole) of N,N,N',N''-tetramethyl-N',N''-bis(methoxymethyl)-2,4,6-triamino-s-triazine in about 5 parts of benzene there is added a solution of 3.3 parts (0.0277 mole) of thionyl chloride in about 5 parts of benzene. After the reaction mixture has refluxed for about 30 minutes, the volatile materials are removed by distillation in vacuo. The residue solidifies on standing and is the desired product.

Calculated for $C_9H_{16}Cl_2N_6$: N, 29.69. Found: N, 29.32.

EXAMPLE 9

N,N'-bis(chloromethyl)-N,N',N''',N'''-tetramethyl-2,4,6-triamino-s-triazine

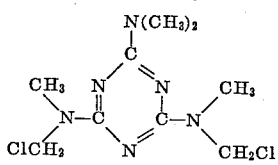

To a solution of 2.06 parts (0.0044 mole) of N,N,N',N''-tetramethyl-N',N''-bis(octyloxymethyl)-2,4,6-triamino-s-triazine in about 10 parts of benzene there is added 1.19 parts (0.01 mole) of thionyl chloride. After refluxing for a short time to expel sulfur dioxide, the reaction mixture is distilled in vacuo to remove benzene and octyl chloride. The crystalline residue is the desired product according to the infrared spectrum when compared with the product of Example 8.

EXAMPLE 10

N,N,N',N'-tetrakis(chloromethyl)-2,4-diamino-s-triazine

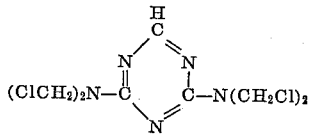

To a solution of 50 parts (0.42 mole) of thionyl chloride in about 25 parts of benzene is added a solution of 28.7 parts (0.1 mole) of N,N,N',N'-tetrakis(methoxymethyl)-2,4-diamino-s-triazine in about 15 parts of benzene. The reaction mixture is heated while sulfur dioxide and methyl chloride are evolved. The remaining volatile materials are removed by vacuum distillation. The residue is the desired product.

EXAMPLE 11

N,N'-bis(chloromethyl)-N,N'-bis(methoxymethyl)-2,4-diamino-6-ethyl-s-triazine

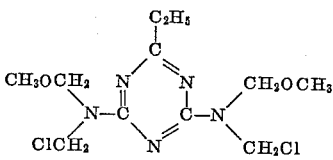

To a solution of 6.30 parts (0.02 mole) of N,N,N',N'-tetrakis(methoxymethyl)-2,4,-diamino-6-ethyl-s-triazine in about 10 parts of benzene there is added a solution of 12.0 parts (0.1 mole) of thionyl chloride in 10 parts of benzene while heating the reaction mixture. After removal of the volatile materials by distillation in vacuo, the residue solidifies. This is the desired product.

EXAMPLE 12

*N,N'-bis(bromomethyl)-N,N'-bis(methoxymethyl)-2,4-diamino-6-phenyl-s-triazine*

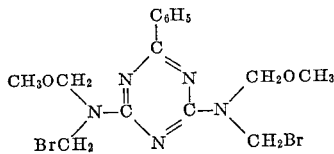

To a solution of 18.17 parts (0.05 mole) of N,N,N',N'-tetrakis(methoxymethyl) - 2,4 - diamino - 6 - phenyl - s-triazine in about 20 parts of toluene at 80° C. there is added a solution of 7.37 parts (0.06 mole) of acetyl bromide in about 5 parts of toluene. The by-product, methyl acetate, and toluene are removed by distillation. The residue on trituration with ether yields the product as a solid.

EXAMPLE 13

*N,N,N',N'-tetrakis(bromomethyl)-2,4-diamino-6-phenyl-s-triazine*

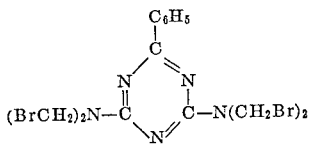

To a solution of 9.08 parts (0.025 mole) of N,N,N',N'-tetrakis(methoxymethyl) - 2,4 - diamino - 6 - phenyl - s-triazine in about 175 parts of benzene there is added a solution of 16.0 parts (0.12 mole) of acetyl bromide in about 25 parts of benzene. The reaction mixture is heated at the reflux temperature for about one hour. After removal of a portion of the solvent by distillation, the residue is cooled, and the product is separated by filtration.

Calculated for $C_{13}H_{13}Br_4N_5$: C, 28.1; H, 2.33; Br, 57.1; N, 12.5. Found: C, 28.1; H, 2.70; Br, 57.3; N, 13.0.

EXAMPLE 14

*2,2'-octamethylenebis[N,N'-bis(chloromethyl)-N,N'-bis(methoxymethyl)-4,6-diamino-s-triazine]*

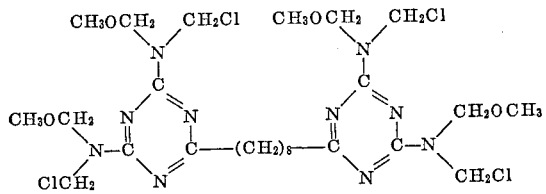

To a solution of 3.2 parts (0.005 mole) of 2,2'-octamethylenebis[N,N,N',N' - tetrakis(methoxymethyl) - 4,6-diamino-s-triazine] in about 5 parts of benzene there is added a solution of 6.0 parts (0.05 mole) of thionyl chloride in about 5 parts of benzene. The reaction mixture is heated for about 30 minutes and the volatile materials are removed by distillation in vacuo. The residual oil solidifies on standing to give the desired product.

Calculated for $C_{26}H_{44}Cl_4N_{10}O_4$: C, 44.4; H, 6.3; N, 19.9. Found: C, 44.4; H, 6.4; N, 19.9.

We claim:

1. A compound selected from the group consisting of those having the formulas

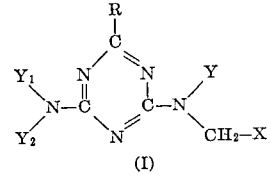

and

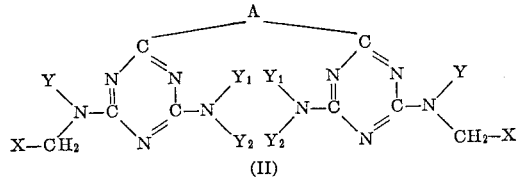

wherein X is selected from the group consisting of chlorine and bromine; R is selected from the group consisting of hydrogen, alkyl of less than 20 carbon atoms, carbocyclic aryl lower alkyl, carbocyclic aryl and

A is a divalent hydrocarbon radical of less than 10 carbon atoms; Y, $Y_1$, $Y_2$, $Y_3$ and $Y_4$ are selected from the group consisting of lower alkyl, —$CH_2OR_1$ and —$CH_2X$; and $R_1$ is selected from the group consisting of alkyl of less than 20 carbon atoms and lower alkenyl.

2. N - chloromethyl - N,N',N',N'' - pentakis(methoxymethyl)-2,4,6-triamino-s-triazine.

3. N,N' - bis(chloromethyl) - N,N',N'',N'' - tetrakis(methoxymethyl)-2,4,6-triamino-s-triazine.

4. N,N',N'' - tris(chloromethyl)-N,N',N'' - tris(methoxymethyl)-2,4,6-triamino-s-triazine.

5. N,N' - bis(chloromethyl) - N,N'-bis(methoxymethyl)-2,4-diamino-6-ethyl-s-triazine.

6. N,N'-bis(chloromethyl) - N,N' - bis(methoxymethyl)-2,4-diamino-6-phenyl-s-triazine.

7. N-bromomethyl - N,N',N',N'',N'' - pentakis(ethoxymethyl)-2,4,6-triamino-s-triazine.

8. N,N',N''-tris(chloromethyl) - N,N',N'' - trimethyl-2,4,6-triamino-s-triazine.

9. N,N'-bis(chloromethyl) - N,N',N'',N''-tetramethyl-2,4,6-triamino-s-triazine.

10. N,N'-bis(chloromethyl) - N,N'N'',N'''-tetramethyl-2,4,6-triamino-s-triazine.

11. N,N,N',N'-tetrakis(bromomethyl) - 2,4-diamino-6-phenyl-s-triazine.

12. 2,2' - octamethylenebis[N,N' - bis(chloromethyl)-N,N'-bis(methoxymethyl)-4,6-diamino-s-triazine].

References Cited by the Examiner

UNITED STATES PATENTS 2,426,700  9/1947  Grim _____ 260—249.6
3,244,713  4/1966  Dowbenko et al. ___ 260—249.9

OTHER REFERENCES

Theilheimer: "Synthetic Methods of Organic Chemistry," vol. 7, Interscience Pub., N.Y. (1953), No. 528, page 226.

WALTER A. MODANCE, *Primary Examiner.*

JOHN M. FORD, *Assistant Examiner.*